(12) United States Patent
Osorio

(10) Patent No.: US 10,632,823 B1
(45) Date of Patent: Apr. 28, 2020

(54) VEHICLE DOOR MODULE, VEHICLE DOOR ASSEMBLY INCLUDING SAME, AND VEHICLE

(71) Applicant: Honda Motor Co., Ltd., Tokyo (JP)

(72) Inventor: Sebastian Osorio, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 16/234,538

(22) Filed: Dec. 27, 2018

(51) Int. Cl.
*B60J 5/04* (2006.01)
*E05B 79/12* (2014.01)
*E05B 83/36* (2014.01)
*B62D 25/04* (2006.01)

(52) U.S. Cl.
CPC ............. *B60J 5/0487* (2013.01); *B60J 5/048* (2013.01); *B62D 25/04* (2013.01); *E05B 79/12* (2013.01); *E05B 83/36* (2013.01); *E05Y 2900/531* (2013.01)

(58) Field of Classification Search
CPC ......... B60J 5/0487; B60J 5/048; B62D 25/04; E05B 79/12; E05B 83/36
USPC ...................... 296/146.1, 146.5, 146.7, 146.9
See application file for complete search history.

(56) References Cited

U.S. PATENT DOCUMENTS

| | | | |
|---|---|---|---|
| 4,603,894 A | 8/1986 | Osenkowski | |
| 5,548,930 A | 8/1996 | Morando | |
| 6,205,714 B1 | 3/2001 | Staser et al. | |
| 6,908,140 B1 | 6/2005 | Carter et al. | |
| 7,192,076 B2 | 3/2007 | Ottino | |
| 7,784,220 B2 | 8/2010 | Wild | |
| 8,739,584 B2 | 6/2014 | Kargilis et al. | |
| 9,475,367 B1* | 10/2016 | Wilson, III | ............ B60J 5/0487 |
| 2004/0061356 A1* | 4/2004 | Martini | .................. B60J 5/0487 296/153 |
| 2005/0253399 A1 | 11/2005 | Yamamoto et al. | |
| 2015/0175114 A1* | 6/2015 | Schroeder | ............... B60R 21/06 296/190.03 |
| 2019/0359039 A1* | 11/2019 | Osorio | .................... B60R 21/02 |

* cited by examiner

*Primary Examiner* — Joseph D. Pape
(74) *Attorney, Agent, or Firm* — Kenealy Vaidya LLP

(57) ABSTRACT

A door module for a vehicle door assembly that includes a net assembly can include an assembly bracket, a latch assembly and a handle. The assembly bracket can include a net attachment portion configured to secure at least a portion of the net assembly when the net assembly is attached to the door assembly, a handle mounting portion, and a latch mounting portion. The latch assembly can be configured to releasably engage the vehicle frame when the door closes the opening, and the latch assembly is connected to the latch mounting portion. The handle can be supported on the handle mounting portion. The handle mounting portion can pivotally support the handle relative to the assembly bracket. The handle can be coupled to the latch assembly such that the latch assembly releases engagement with the frame assembly when the handle pivots in a predetermined direction.

20 Claims, 7 Drawing Sheets

US 10,632,823 B1

VEHICLE DOOR MODULE, VEHICLE DOOR ASSEMBLY INCLUDING SAME, AND VEHICLE

BACKGROUND

The disclosed subject matter relates to a vehicle door module, and methods of use and manufacture thereof.

A vehicle can include one or more doors or door assemblies that can permit ingress/egress to/from a vehicle interior or vehicle storage area. A door assembly of a vehicle can be rotatably attached to a frame or other supporting structure of a vehicle. For example, a door assembly can be pivotally attached by a hinge so as to allow the door assembly to be opened and closed. A door assembly of a vehicle includes and/or is associated with various components.

However, known arrangements of door assemblies have deficiencies.

SUMMARY OF THE INVENTION

Some embodiments are directed toward a door module for a door assembly. The door assembly can selectively open and close an opening in a vehicle frame. The door assembly can include a net assembly and a door panel. The door module can include an assembly bracket, a latch assembly and a handle. The assembly bracket can include a plurality of panel attachment structures configured to attach the assembly bracket to the door panel, a net attachment portion configured to secure at least a portion of the net assembly when the net assembly is attached to the door assembly, a handle mounting portion, and a latch mounting portion. The latch assembly can be configured to releasably engage the vehicle frame when the door closes the opening, and the latch assembly is connected to the latch mounting portion. The handle can be supported on the handle mounting portion. The handle mounting portion can pivotally support the handle relative to the assembly bracket. The handle can be coupled to the latch assembly such that the latch assembly releases engagement with the frame assembly when the handle pivots in a predetermined direction.

Some embodiments are directed toward a door assembly for a vehicle. The door assembly can selectively open and close an opening in a vehicle frame of the vehicle. The door assembly can include a door panel, a net assembly and door module. The net assembly can include a mesh netting, a net frame connected to and surrounding the mesh netting, and a strap segment connected to and extending away from the net frame. The door module can be mounted on the door panel and can include an assembly bracket, a latch assembly and a handle. The assembly bracket can include a plurality of panel attachment structure that supports fasteners and the fastener attaching the assembly bracket to the door panel, a net attachment structure connected to the at least one strap segment, a handle mounting portion, and a latch mounting portion. The latch assembly can be configured to releasably engage the vehicle frame when the door closes the opening. The latch assembly can be connected to the latch mounting portion. The handle can be supported on the handle mounting portion. The handle mounting portion can pivotally support the handle relative to the assembly bracket. The handle can be coupled to the latch assembly such that the latch assembly releases engagement with the frame assembly when the handle pivots in a predetermined direction.

Some embodiments are directed toward an all-terrain vehicle that can include a frame assembly, a plurality of wheels, and a door assembly. The frame assembly can include a plurality of frame members connected together to extend around a passenger area and form a door opening. The plurality of wheels can be connected to the frame assembly. At least one of the wheels can be configured to be driven by a powertrain. The door assembly can be pivotally connected to one of the frame members and movable between an open position where the door assembly spaced away from at least a portion of the door opening and closed position where the door assembly extends across the door opening. The door assembly can include a door panel assembly, a net assembly, and a door module. The door panel assembly can extend across a first portion of the door opening when the door assembly is in the closed position. The net assembly can extend across a second portion of the door opening when the door assembly is in the closed position. The net assembly can include a first strap segment extending from and connected to the door assembly and a second strap segment extending from and connected one of the frame members. The door module can be connected to the panel assembly and can including an assembly bracket, a latch assembly and a handle. The assembly bracket can include a plurality of panel attachment structures spaced along the assembly bracket, a net attachment structure the first strap segment, a handle mounting portion, a latch mounting portion, and a plurality of fasteners. Each of the fasteners is connected to a respective one of the fastener structures and the door panel assembly. The latch assembly can be configured to releasably engage the vehicle frame assembly when the door closes the opening. The latch assembly is connected to the latch mounting portion. The handle can be supported on the handle mounting portion. The handle mounting portion can pivotally support the handle relative to the assembly bracket. The handle can be coupled to the latch assembly such that the latch assembly releases engagement with the frame assembly when the handle pivots in a predetermined direction.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A door module is provided that includes a single assembly bracket that can be used to easily and accurately attach multiple components to a door panel. In particular, the assembly bracket can be used to attach a latch assembly, a handle assembly, and a net assembly. The assembly bracket can include panel attachment structure to attach the assembly bracket to a door panel. The door module provides for quick and accurate positioning of the latch assembly and the handle assembly, as well as quick and accurate attachment and securement of a strap or strap segment of the net assembly. In particular, an advantage of the arrangement of the disclosure is to simplify door assembly in manufacturing and to simplify interface between door and door latch components. One bracket can be used to attach the latch; handle; latch linkage, operating linkage, or mechanical coupling; and net. This bracket then is assembled to the door. Further details are described below.

Figure 1:
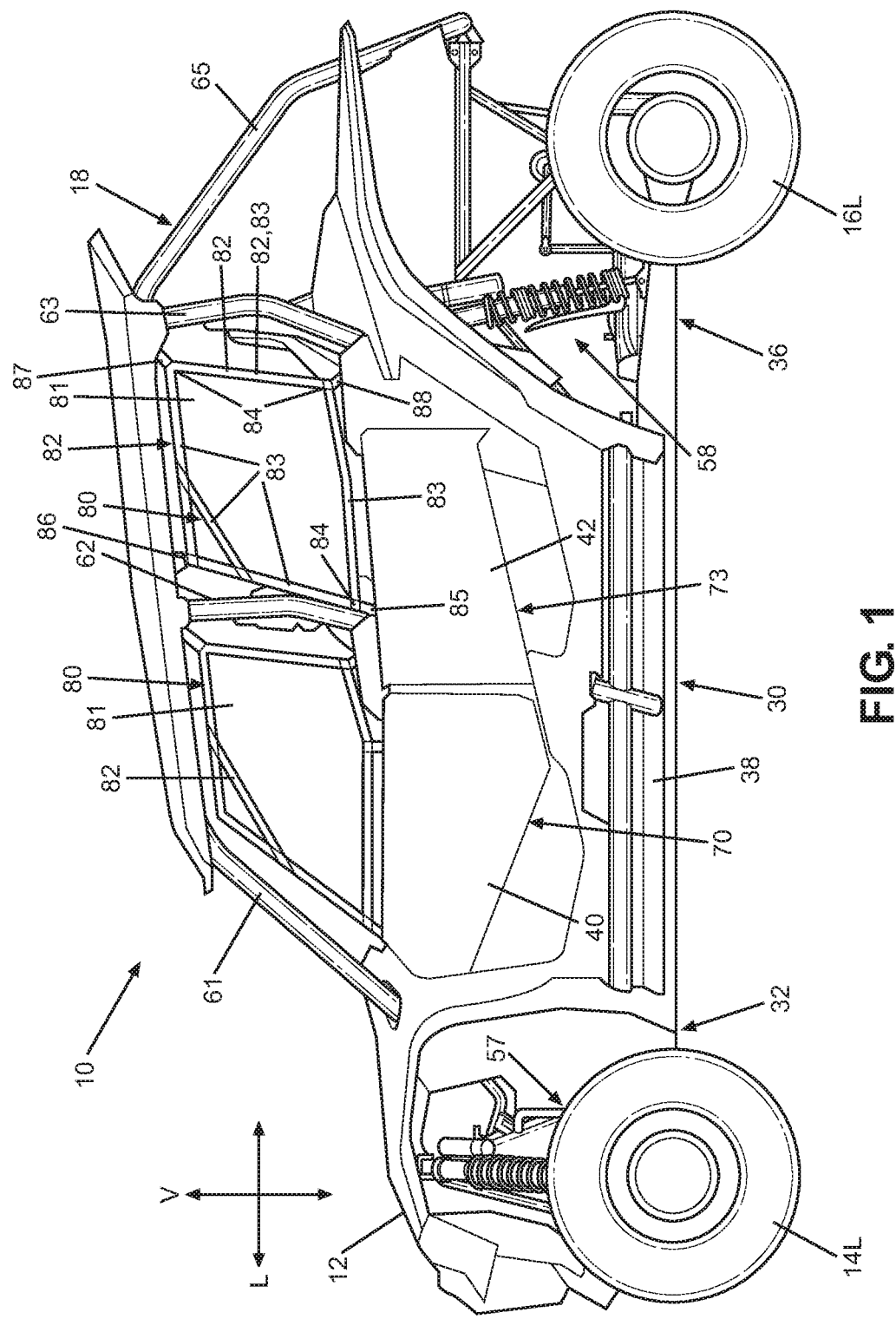
FIG. 1 is a left side view of an exterior of a vehicle in accordance with the disclosed subject matter.

The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV). However, the disclosed vehicle frame assembly with door assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 3:
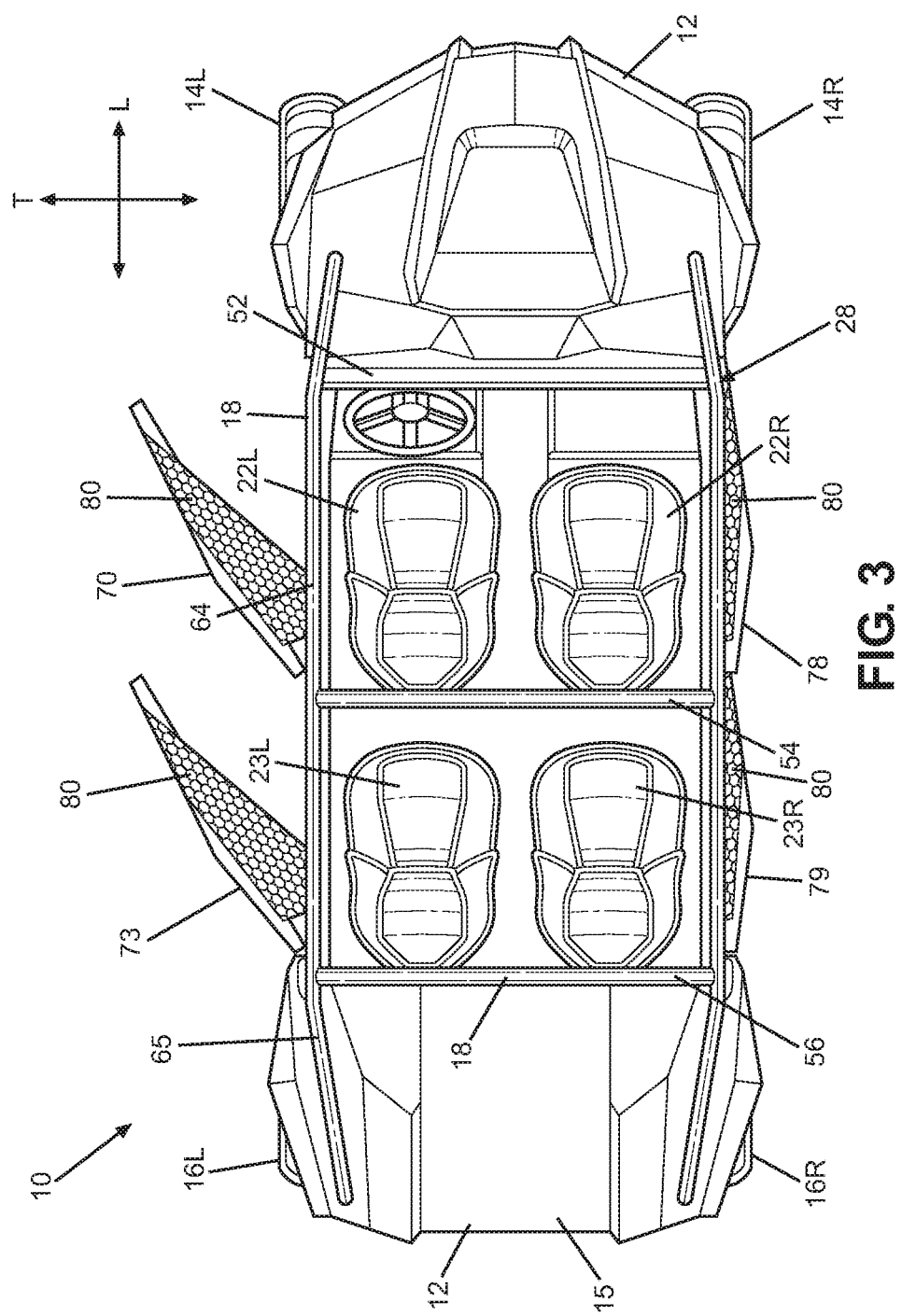
FIG. 3 is a top view of a vehicle shown in FIG. 1 in accordance with the disclosed subject matter.

Referring to FIGS. 1 and 3, the vehicle 10 can include a body 12, a pair of front wheels, 14L, 14R, a pair of rear wheels 16L, 16R, a frame assembly 18, a pair of front door assemblies 70, 78, a pair of rear door assemblies 73, 79, and a powertrain. Portions of the frame assembly 18 are hidden from view in FIG. 1 by the body 12 (but are shown in FIG. 3, for example), and the powertrain is omitted for simplicity and clarity of the drawings.

The vehicle 10 can include a pair of front seats 22L, 22R and a pair of rear seats 23L, 23R mounted in a passenger area of the vehicle 10. The frame assembly 18 can include a roll cage 28 configured to extend around and above the seats 22L, 22R, 23L, 23R and the passenger area. The roll cage 28 can cooperate with the body 12 and/or at least a portion of the frame assembly 18 to define door openings through which a passenger may pass in order to enter or exit the passenger area.

The door assemblies 70, 73, 78, 79, which occupy the door openings, each can include a panel door assembly, and can be configured to selectively open and close access through the door openings by moving between a closed position and a partially opened or fully opened position. In the closed position, the door assemblies 70, 73, 78, 79, can span the respective door openings to obstruct access to or from the passenger area via the door openings. In the closed position or disposition, the front portion of each door assembly 70, 73, 78, 79 can be latched to the roll cage 28. The partially opened position (or disposition) or the fully opened position (or disposition) can be any position where the door assemblies 70, 73, 78, 79 are pivoted away from the respective door openings to provide substantially unobstructed access to the passenger area via the door openings.

Figure 2:
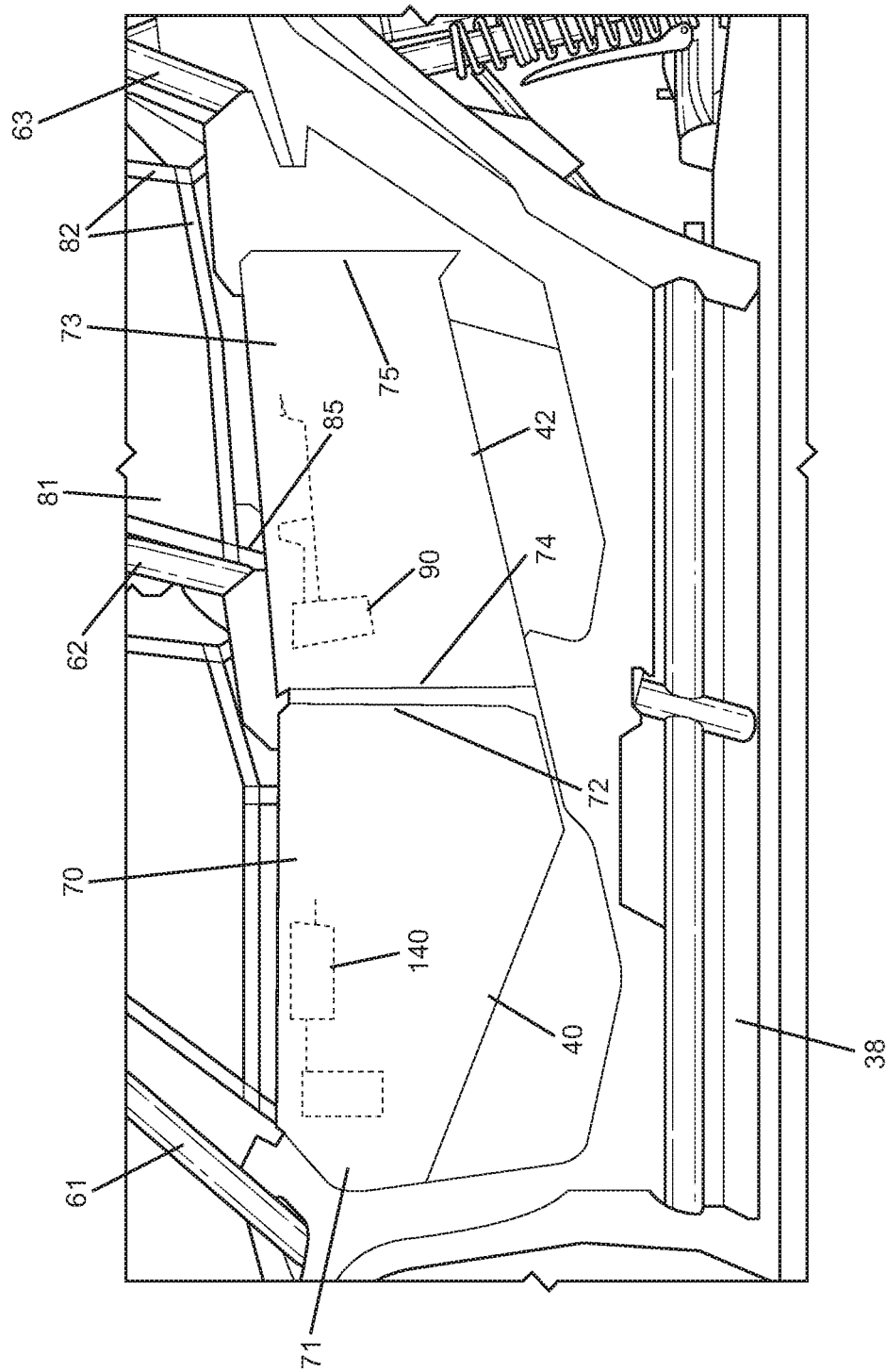
FIG. 2 is a left partial side view showing details of door assemblies of the vehicle shown in FIG. 1 in accordance with the disclosed subject matter.
Figure 5:
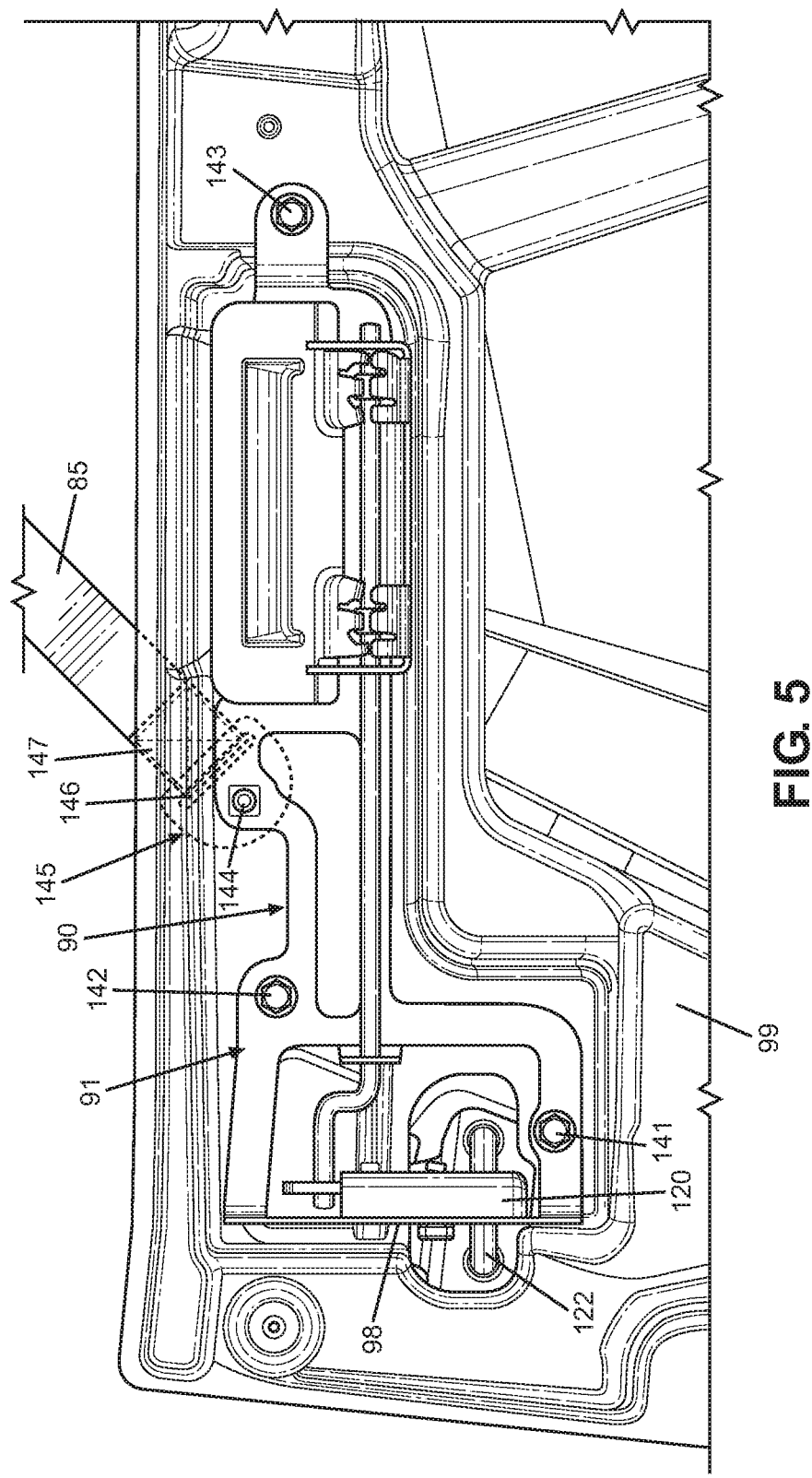
FIG. 5 is a left side view showing details of the door module of FIG. 4, mounted on a door panel, in accordance with the disclosed subject matter.
Figure 6:
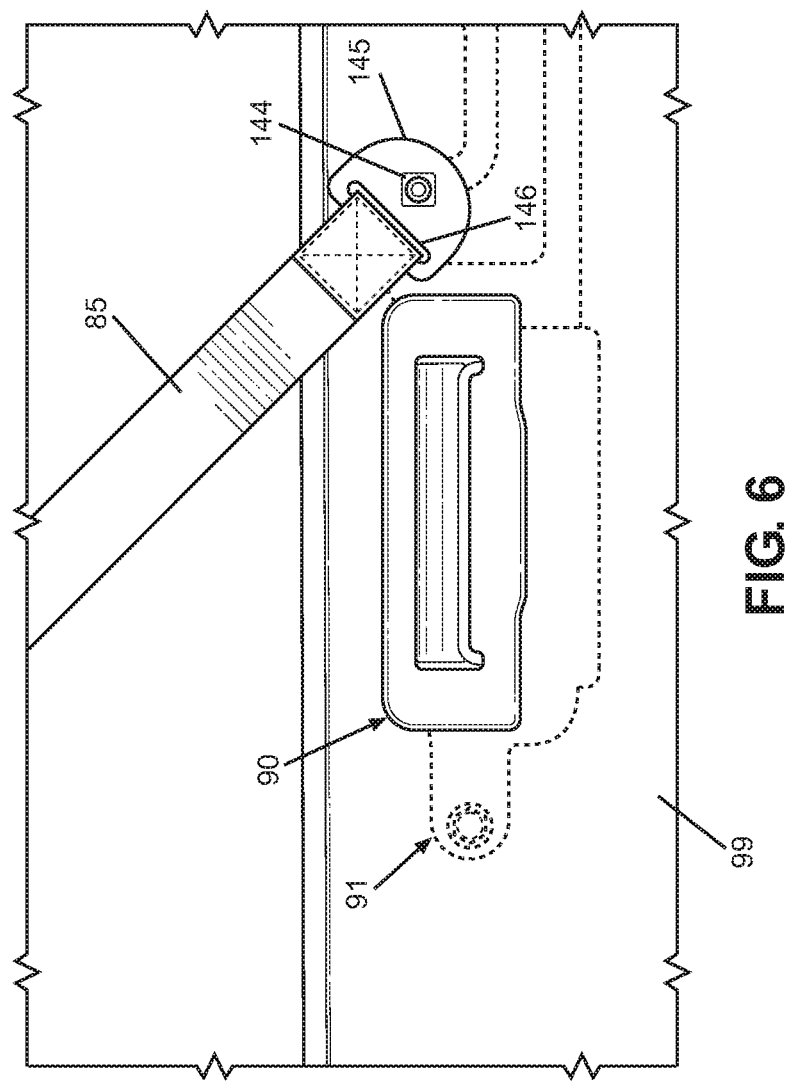
FIG. 6 is a right side view showing details of the door module of FIG. 4, mounted on a door panel, in accordance with the disclosed subject matter.

FIG. 3 shows the left-side door assemblies 70, 73 in the open position and the right-side door assemblies 78, 79 in the closed position. Each of the door assemblies 70, 73, 78, 79 can be constructed as desired. For example, with reference to the left side of the vehicle as shown in FIG. 2, the door assemblies can be constructed of one or more panels of a respective panel assembly 40, 42. Each of the panel assemblies can have an uninterrupted exterior surface. Alternatively, the door panel assemblies 40, 42 can be constructed in various other manners as may be desired. For example, each of the door panel assemblies 40, 42 can include an inner door panel that faces toward the passenger area of the vehicle 10 and an outer door panel that faces toward the exterior of the vehicle 10. The outer door panel is shown in FIGS. 1-3. The inner panel 99 is shown in FIGS. 5 and 6. The inner door panel 99 can be connected to the outer door panel such that a space is enclosed therebetween. As will be discussed in further detail below, a door module 90 can be mounted to the inner door panel 99 and located in the space between the inner door panel 99 and the outer door panel. One or more of the door panel assemblies 40, 42 can have a continuous outer surface or an outer surface that is interrupted by one or more holes, ridges and/or other contour or character features.

The vehicle 10 can include a powertrain. The powertrain can include an internal combustion engine, one or more electric motor(s) or a hybrid of an internal combustion engine and one or more electric motor(s), or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14R and selectively drive the rear wheels 16L, 16R.

The vehicle 10 can include frame assembly 18 as shown and described above. In particular, FIG. 3 is provided with upper panels, including a roof panel, removed for simplicity and clarity of the drawing. The frame assembly 18 can be configured to support the body 12, door assemblies 70, 73, 78, 79, seats 22L, 22R, 23L, 23R, suspension components for the wheels 14L, 14R, 16L, 16R, powertrain, steering system, control pedal assemblies, passengers and cargo items, for example. The frame assembly 18 can be configured to withstand various modes of operation, including operation on unimproved paths, and can be configured to surround the passenger area. The frame assembly 18 can include a main frame assembly 30, a front frame assembly 32 and a rear frame assembly 36.

The main frame assembly 30 can define the passenger area of the vehicle 10. The main frame assembly 30 can also provide an overall bending stiffness and torsional stiffness characteristic for the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/ systems, such as but not limited to portions of the body 12, a front final drive assembly, steering system components, engine cooling system, headlights, etc.

A front bumper assembly can be connected to the front end of the front frame assembly 32, such that the front frame assembly 32 can be located between the front bumper assembly and the main frame assembly 30. A front bumper assembly can extend beyond the exterior of the body 12, or alternatively, one or more portions of the body 12 can conceal a front bumper assembly.

The rear frame assembly 36 can be connected to the rear end of the main frame assembly 30 such that the passenger compartment is located between the front frame assembly 32 and the rear frame assembly 36. The rear frame assembly 36 can be configured with mounting points for the rear suspension components and any appropriate components/systems, such as but not limited to portions of the body 12, a rear final drive assembly, taillights, etc.

The main frame assembly 30, front frame assembly 32 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

Further referring to FIG. 1 and FIG. 2 and the left side of the vehicle, the front frame assembly 32 can be connected to a lower cross member and a first cage side member 61 of the main frame assembly 30. The front frame assembly 32 can be configured to support a front suspension and wheel assembly 57 (FIG. 1), and other components such as but not limited to a radiator, a steering rack assembly and a front final drive assembly. Referring to FIG. 1, the front suspension and wheel assembly 57 can include a front suspension member on each side of the front frame assembly 32, and a damper and spring assembly on each side of the front frame assembly 32.

The front frame assembly 32 can include or be connected to front lower frame members, as well as other associated frame members, which can be configured as hollow metal tubes having a substantially circular cross-section. However, any combination of the front frame members can be or have a cross-sectional shape that is different from a substantially circular cross-sectional shape. Further, any combination of the front frame members, including front frame members and other associated frame members, can be formed of a material other than metal, such as but not limited to carbon fiber, plastic, carbon fiber reinforced plastic, ceramic, pulp, or glass fiber reinforced plastic.

Further, the front lower frame members and other associated frame members can be welded to each other to form the structure described above. Embodiments are intended to include or otherwise cover any combination of the front lower frame members and other associated frame members connected by threaded fasteners, adhesives, a combination of brackets and threaded fasteners, rivets, or other known connective structures, materials, or methods.

Further referring to FIG. 1, the rear frame assembly 36 can be configured to support a rear suspension and wheel assembly 58, and other components such as but not limited to a power source, a transmission and a rear final drive assembly. The rear suspension and wheel assembly 58 can include, for example, at least one rear suspension member on each side of the rear frame assembly 36, a rear damper and spring assembly on each side of the rear frame assembly 36, a rear hub assembly on each side of the rear frame assembly 36, and the rear wheels 16L, 16R.

The rear frame assembly 36 can be connected to and can extend away from the main frame assembly 30 in the longitudinal direction L of the vehicle 10.

The rear frame assembly 36 in conjunction with other support components can be configured to support a powertrain assembly. For example, an exemplary powertrain, as described above, can include a power source such as but not limited to an internal combustion engine (having a single cylinder or a plurality of cylinders), an electric motor, or a hybrid system that includes an internal combustion engine and an electric motor. The powertrain also can include a transmission connected to the power source and a final drive structure. The transmission can include various types of transmissions including a stepped speed ratio assembly or a continuously variable speed ratio assembly. The transmission can be configured as an automatic transmission, a manual transmission, or a semi-automatic transmission. A power source and the transmission can be connected to the rear frame assembly 36 in any appropriate manner such as but not limited to brackets and mechanical fasteners, welds, rivets, rubber mounting assembly(ies), fluid filled mounting assembly(ies), or any combination thereof.

Further referring to FIGS. 1-3, the main frame assembly 30 can define the passenger area and can include the roll cage 28, longitudinal frame members 38 on opposing sides of the vehicle, lower cross members, and other frame members. Frame members can be connected together to form a fixed frame assembly or modular frame assembly in which selective removal and attachment is not or is intended. That is, the frame members can be intended to remain fixed to each other unless a destructive process such as but not limited to sawing, cutting, crushing, ripping, melting, etc., is applied to the fixed frame assembly. In contrast, some frame members can be intended to be selectively removable and attachable to a remainder of the main frame assembly 30, for example, without requiring a destructive process such as but not limited to sawing, cutting, crushing, ripping, melting, etc. The longitudinal members 38 can extend in the longitudinal direction L of the vehicle 10, from the front of the passenger area to the rear of the passenger area. The longitudinal members 38 can each be configured as a substantially straight, hollow beam having a substantially rectangular cross-sectional shape.

As shown in FIG. 3, a roll cage 28 generally defines the passenger compartment. The roll cage 28 can extend in the longitudinal direction L of the vehicle 10, from the front end of the passenger area to the rear end of the passenger area. The roll cage 28 can define the limits of the passenger area in the transverse direction T of the vehicle 10, the longitudinal direction L of the vehicle 10 and in the vertical direction V of the vehicle 10. The roll cage 28 can be configured to support the door assemblies 70, 73, 78, 79 and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc.

Figure 4:
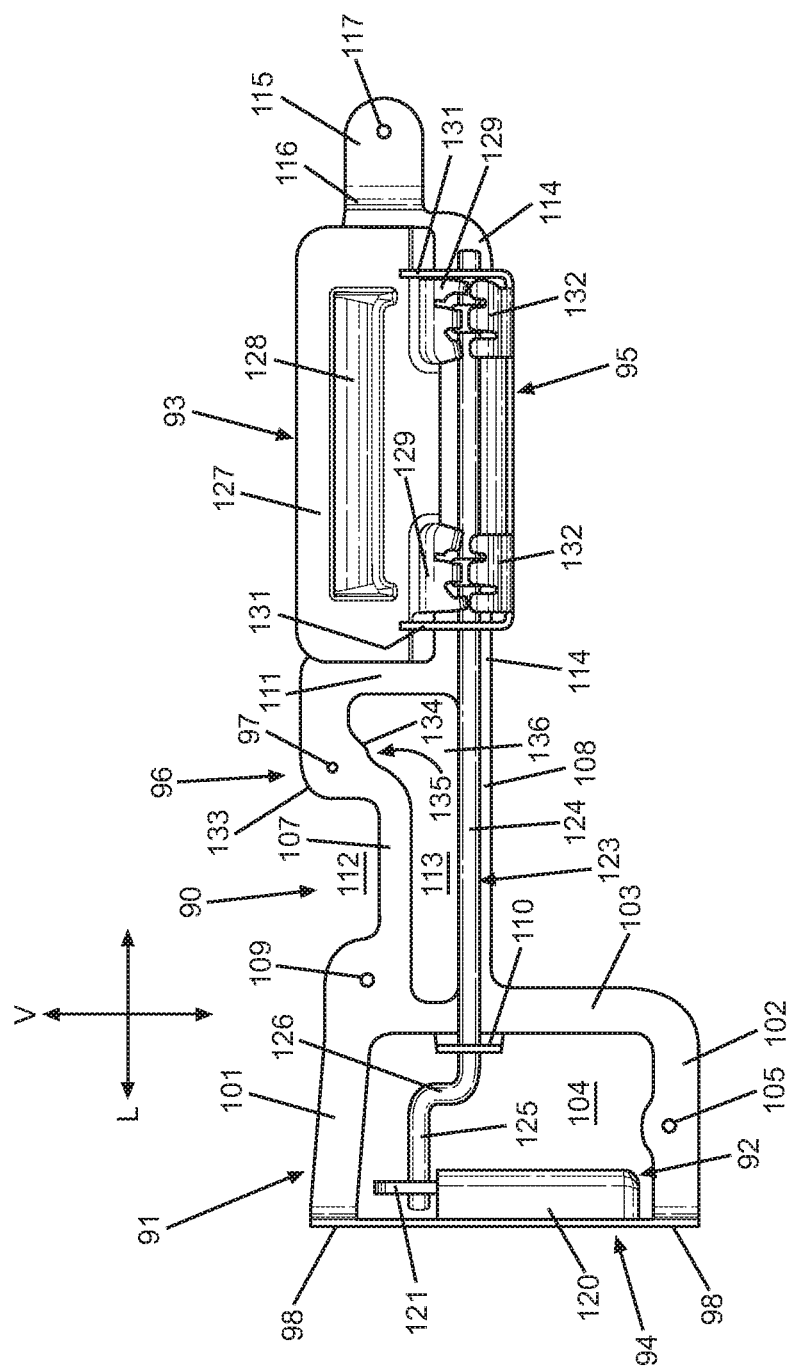
FIG. 4 is a left side view showing details of a door module in accordance with the disclosed subject matter.

The roll cage 28 can be configured to resist, impede, or minimize deformation that could be caused by a load or kinetic energy input into the roll cage 28. The roll cage 28 can be configured with any shape and contour that can be advantageous to meet the structural performance and aesthetic appeal desired for the vehicle 10. The roll cage 28 can be formed from any appropriate number of structural elements, from one to any number greater than one. For example, the roll cage 28 can include a plurality of cage cross members 52, 54, and 56 (as shown in FIG. 4), and a plurality of cage side members 61, 62, 63, 64 and 65, and the right side of the vehicle can be mirror image to the left side of the vehicle shown in FIG. 1. Each of the cage members can be configured as a hollow tube having a substantially circular or oval cross-section shape. The cage members can be configured with any appropriate elongated shape that can provide the desired dimensionality of the passenger area and advantageously conform to the aesthetic appearance desired for the vehicle 10. For example, the cage members can be made from one or more lengths of a metal tube. Any one of the tubular cage members can be bent in one or more locations into a predetermined shape.

Each of the first cage side members 61 can be referred to as an A-pillar. Each of the first cage side members 61 can be connected at one end to a respective one of the longitudinal members 38 adjacent the front end of the respective one of the longitudinal members 38. Each of the first cage side members 61 can extend along each of the vertical direction V, the transverse direction T and the longitudinal direction L of the vehicle 10.

As shown in FIG. 3, the roll cage 28 may also include fourth cage side members 64. Each of the fourth cage side members 64 can be referred to as a roof rail or a top rail. Each of the fourth cage side members 64 can extend from and connect to a respective one of the first cage side members 61. Each of the fourth cage side members 64 can connect to a respective one of the third cage side members 63. Each of the fourth cage side members 64 can connect to a respective one of second cage side members 62. Each of the fourth cage side members 64 can connect to a respective one of the fifth cage side members 65. Each of the fourth cage side members 64 can extend along at least the longitudinal direction L of the vehicle 10.

The first cage cross member 52 can be connected to either the first cage side members 61 or the fourth cage side members 64 at a location that is adjacent to or at the junction of the first cage side members 61 and the fourth cage side members 64. Alternatively, the first cage cross member 52 can be connected at the junction of the first cage side members 61 and the fourth cage side members 64.

Each of second cage side members 62 can be referred to as a B-pillar. Each of the second cage side members 62 can be connected at a first end to a respective one of the longitudinal members 38 along the side of the respective one of the longitudinal members 38. Each of the second cage side members 62 can be connected to an outer side of the respective one of the longitudinal members 38.

Each of the second cage side members 62 can be connected at a second end to a respective one of the fourth cage side members 64. The second cage cross member 54 can be connected to either the fourth cage side members 64, or the second cage side members 62, or a location that is adjacent to or at the junction of the fourth cage side members 64 and the second cage side members 62.

Each of third cage side members 63 can be referred to as a C-pillar. Each of the third cage side members 63 can be connected at a first end to a respective one of the longitudinal members 38 along the side or at the rear end of the respective one of the longitudinal members 38. Each of the third cage side members 63 can be connected to an outer side of the respective one of the longitudinal members 38.

Each of the third cage side members 63 can be connected at a second end to either a respective one of the fourth cage side members 64 or a respective one of fifth cage side members 65 at a location that is adjacent to or at a junction of the respective one of the fourth cage side members 64 and the respective one of the fifth cage side members 65. Alternatively, each of the third cage side members 63 can be connected at the second end to the junction of the respective one of the fourth cage side members 64 and the respective one of the fifth cage side members 65.

The third cage cross member 56 can be connected to either the fourth cage side members 64, or the third cage side members 63, or the fifth cage side members 65, or alternatively, at a location that is adjacent to or at the junction of the fourth cage side members 64, or the third cage side members 63, or the fifth cage side members 65.

Each of the fifth cage side members 65 can be connected to and extend away from a respective one of the fourth cage side members 64 along the longitudinal direction L of the vehicle 10.

The cage cross members 52, 54, 56, can extend in the transverse direction T of the vehicle 10 from the left side of the roll cage 28 to the right side of the roll cage 28. The cage cross members 52, 54, 56, can be connected to each of respective pair(s) of the cage side members at respective locations spaced apart along the longitudinal direction L of the vehicle 10. The cage cross members 52, 54, 56, can be configured to maintain a predetermined spacing between the cage side members 61, 62, 63, 64, 65 in the transverse direction T. The cage cross members 52, 54, 56 can define limits of the passenger area in the longitudinal direction L of the vehicle 10 and the vertical direction V of the vehicle 10. The cage cross members 52, 54, 56 can be configured to manage load and/or energy inputs so that deflection of the frame assembly 18 in the vicinity of the passenger area can be controlled in an advantageous predetermined manner. In the exemplary embodiment of FIG. 3, the cage cross members 52, 54, 56 can be connected to a respective left-side and right-side pair of the cage side members 61, 62, 63, 64, 65 by welding.

As shown in FIG. 2, the vehicle 10 can include a rear door assembly 73. The rear door assembly 73 includes a rear portion 75. The rear door assembly 73 may be pivotally supported by a hinge assembly at or adjacent to the rear portion 75 so as to allow movement of the rear door assembly 73 between a closed position and an open position. The rear door assembly 73 can include a front portion 74.

As shown in FIG. 2, the vehicle 10 can include a front door assembly 70. The front door assembly 70 includes a front portion 71 and a rear portion 72. The front door assembly 70 may be pivotally supported by a hinge assembly at or adjacent to the rear portion 72 so as to allow movement of the front door assembly 70 between a closed position and an open position.

Each of the door assemblies 70, 73, 78, 79 can include a net assembly 80 that includes a mesh netting 81 and a frame 82 that surrounds the mesh netting 81. The frame 82 can be connected to each of the frame assembly 18 and a respective one of the door panel assemblies 40, 42. Accordingly, a respective net assembly 80 can be positioned above the front door panel assembly 40 and/or above the rear door panel assembly 42. The net assembly 80 can serve to block or close off an upper portion of an opening in the vehicle frame or vehicle frame assembly 18. Accordingly, the net assembly 80 can operate in conjunction with one or more door panels, of a door, to selectively open and close an opening in the vehicle frame assembly 18.

As shown in FIG. 1, each frame 82 can include a plurality of frame members 83. The frame members 83 can define corners 84 of the net assembly 80. Each of the frame members 83 can either terminate at a respective corner 84 of the net assembly or extend beyond a respective corner 84 of the net assembly 80. The frame members 83 that extend beyond a respective corner of the net assembly can provide strap segments for attachment of the net assembly 80 to either the frame 82 of the vehicle or to the door panel assemblies of the vehicle.

The strap segments can include a first strap segment 85 provided at a front lower portion of the net assembly 80, a second strap segment 86 provided at a front upper portion of the net assembly, a third strap segment 87 provided at a rear upper portion of the net assembly 80, and a fourth strap segment 88 provided at a rear lower portion of the net assembly 80.

The second strap segment 86 can be connected to the fourth cage side member 64 or otherwise connected to the roll cage 28. The third strap segment 87 can be connected to the fourth cage side member 64 and/or can be connected to the third cage side member 63. The fourth strap segment 88 can be connected to a rear upper portion of the rear door assembly 73. In accordance with at least one embodiment of the disclosed subject matter, the first strap segment 85 can be connected to a door module 90, which includes an assembly bracket 91. The assembly bracket 91 can be connected to an inner door panel 99, as shown in FIG. 5.

FIG. 4 is a side view of a door module 90 that includes an assembly bracket 91 in accordance with at least one embodiment of the disclosed subject matter. The door module 90 includes a single assembly bracket 91 that can be used to easily and accurately attach multiple components to the door panel 90. In particular, the assembly bracket 91 can be used to attach a latch assembly 92, a handle assembly 93, and the net assembly 80 to the rear door panel assembly 42. The assembly bracket 91 can include holes that are matched, in assembly of the vehicle, to holes in the inner door panel 99 to which the door module 90 is attached. Accordingly, the arrangement provides substantial ease in assembly in a manufacturing process. In particular, the door module 90 provides for quick and accurate positioning of the latch assembly 92 and the handle assembly 93, as well as quick and accurate attachment of the first strap segment 85, to the rear door assembly 73, for example. The assembly bracket 91 can be constructed of stamped metal, in accordance with at least one embodiment of the disclosed subject matter. The door module 90 can be used in a door or door assembly for ingress/egress of an occupant/user. The door module 90 can be used in a door or door assembly for ingress/egress of a storage compartment or storage area of the vehicle.

As shown in FIG. 4, the assembly bracket 91 can include a latch mounting portion 94. The latch assembly 92 can be mounted to the latch mounting portion 94. The assembly bracket can include a handle mounting portion 95. The handle assembly 93 can be mounted to the handle mounting portion 95. The assembly bracket 91 can also include a net attachment portion 96. The net attachment portion 96 can be configured to secure at least a portion of the net assembly 80 when the net assembly 80 is attached to the door assembly 42. For example, the net attachment portion 96 can be configured to secure the first strap segment 85 to the assembly bracket 91.

The assembly bracket 91 can be constructed of various flanges, strips, or other structure so as to provide required strength and so as to provide requisite attachment points for the latch assembly 92, the handle assembly 93, and the first strap segment 85.

As shown in FIG. 4, the latch mounting portion 94 can be constituted by or include a latch flange 98. For example, the latch flange 98 can be in the form of a plate provided at a forward end of the assembly bracket 91 in the longitudinal direction L of the vehicle 10. The latch flange 98 can extend in a transverse or substantially transverse direction T of the vehicle 10. A latch housing 120 can be attached to the latch flange 98.

The assembly bracket 91 can include, at a forward portion thereof in the longitudinal direction L of the vehicle, an upper end strip 101 (also referred to as a fifth strip) and a lower end strip 102 (also referred to as a sixth strip). The upper end strip 101 in conjunction with the lower end strip 102 can support the latch flange 98. The upper end strip 101 and the lower end strip 102 can extend in the longitudinal direction L of the vehicle whereas the latch flange 98 can extend in a transverse direction T of the vehicle, as described above. Accordingly, the latch flange 98 can be at right angle or substantially right angle to both the upper end strip 101 and the lower end strip 102.

Each of the upper end strip 101 and the lower end strip 102 can be connected at rear end thereof, to a first vertical strip 103 (also referred to as a first strip). A first opening 104 can be formed by the arrangement of the latch flange 98, the lower end strip 102, the upper end strip 101, and the first vertical strip 103.

The assembly bracket 91 can include a plurality of panel attachment structure that serves to attach the assembly bracket 91 to a suitable door panel, such as inner door panel 99. For example, the lower end strip 102 may be provided with panel attachment structure that includes a first connection aperture 105. The first connection aperture 105 can house or support a suitable fastener to connect or attach the door module 90 to the inner door panel 99.

As shown in FIG. 4, an actuator rod flange 110 can be provided on a forward side, in the longitudinal direction L of the vehicle, of the first vertical strip 103. The actuator rod flange 110 can extend into the first opening 104. The actuator rod flange 110 can extend in a transverse direction T to the vehicle. The actuator rod flange 110 can serve to support an actuator rod 123, as described below.

The assembly bracket 91 can also include an upper central strip 107 (also referred to as a third strip) and a lower central strip 108 (also referred to as a fourth strip). The lower central strip 108 can extend from a rear side of the first vertical strip 103 so as to constitute a part of a central or middle portion of the assembly bracket 91. The upper central strip 107 can extend from an upper portion of the first vertical strip 103 and/or from a rear side of the upper end strip 101. The upper central strip 107 can extend from a junction of the first vertical strip 103 and the upper end strip 101. The upper end strip 101, the first vertical strip 103, the upper central strip 107 and/or a junction of the strips 101, 103, 107 can be provided with a second connection aperture 109. The second connection aperture 109 can serve to house or support a further suitable fastener to connect or attach the door module 90 to a door panel, such as to inner door panel 99. Accordingly, the second connection aperture 109 can constitute a further part of the panel attachment structure that connects the door module 90 to a door panel The upper central strip 107 can be in a U-shape as shown in FIG. 4. That is, such U-shape of the upper central strip 107 can define cutout 112 that extends along a concave edge portion of the upper central strip 107. As with other portions of the assembly bracket 91, the particular geometry of the upper central strip 107 can provide the requisite strength and requisite support for attachment of the various components that are attached to the assembly bracket 91. The particular geometry of the upper central strip 107 can minimize an amount of material, and associated weight, needed to construct the assembly bracket 91, while providing requisite strength. For example, such advantages are provided by the geometry, of the assembly bracket 91, including the first opening 104 and a second opening 113. The second opening 113 can be provided by the upper central strip 107, the lower central strip 108, the first vertical strip 103 and a second vertical strip 111 (also referred to as a second strip).

As shown in FIG. 4, the upper central strip 107 (or a junction of the upper central strip 107, the first vertical strip 103 and the upper end strip 101) can include a net attachment aperture 97. The net attachment aperture 97 can be located on the upper central strip 107 and proximate an upper edge of the assembly bracket 91. The net attachment aperture 97 can be provided adjacent a rear side or end of the concave edge 112 of the upper central strip 107. The net attachment aperture 97 can be provided above the second opening 113 of the assembly bracket 91. The upper central strip 107 can be provided with a corner 133 that defines a part of the concave edge 112. The upper central strip 107 can be provided with a bulbous portion 134 that extends into the opening 113. The corner 133 and the bulbous portion 134 can collectively define an expanded portion 135 of the upper central strip 107. The bulbous portion 134 can be disposed proximate to and/or defined by an expanded opening portion 136 of the second opening 113. Such provided structure and geometry of the assembly bracket 91, including the expanded portion 135 of the upper central strip 107, can provide a structurally sound support that can effectively support forces applied to the assembly bracket 91 by the net assembly 80. Such forces applied to the assembly bracket 91 by the net assembly 80 can result from a user pushing or pulling on the net assembly 80, for example.

That is, the net attachment aperture 97 and the expanded portion 135 of the upper central strip 107 can constitute a net attachment structure of the net attachment portion. Alternatively, instead of the net attachment aperture 97, the net attachment structure can include a stud (threaded or unthreaded) that is connected to the expanded portion 135 in any appropriate manner such as but not limited to a weld, an adhesive, threaded nut (in the case of a threaded stud configured as a threaded bolt, etc. In yet another alternate embodiment, a threaded nut can be mounted on the net attachment portion 96 concentrically with the net attachment aperture 96. The threaded nut can be connected to the net attachment portion 96 in any appropriate manner such as but not limited to welding, adhesives, etc. The net assembly can include an anchor or other mechanical fastening structure that is configured to permanently, semi-permanently, or releasably engage the net attachment structure. Further details of the connection between the net attachment portion 96 and the net assembly 80 will be discussed below.

The assembly bracket 91 can also include the second vertical strip 111. The second vertical strip 111, at an upper end thereof, can be connected to a rear side or end of the upper central strip 107. The second vertical strip 111, at a lower end thereof, can be connected to a rear side or end of the lower central strip 108.

A handle end portion 114 can be attached to or include the second vertical strip 111. The handle end portion 114 can extend rearwardly, in the longitudinal direction L of the vehicle 10, from the second vertical strip 111. The handle end portion 114 can include the handle mounting portion 95. The assembly bracket 91 can also include a tab 115. The tab 115 can extend rearwardly, in the longitudinal direction L of the vehicle 10, from a rear end of the handle end portion 114.

For example, the tab 115 may be provided with panel attachment structure that includes a third connection aperture 117. The third connection aperture 117 can house or support a suitable fastener to connect or attach the door module 90 to the inner door panel 99. Accordingly, the third connection aperture 117 can house or support a suitable fastener to provide a further panel attachment structure.

The tab 115 can be connected to the handle end portion 114 by a transverse bend portion 116. The transverse bend portion 116 can extend on a rear end of the handle end portion 114 and connect to a forward end of the tab 115. The transverse bend portion 116 can extend in a transverse direction T direction of the vehicle 10 or in each of the transverse direction T and the longitudinal direction V of the vehicle 10 as desired. Accordingly, in some door assemblies it may be desired or needed for the tab 115, that includes the third connection aperture 117, to be in a different transverse plane or position, of the vehicle 10, relative to the transverse plane or position of the handle end portion 114. The transverse bend portion 116 can be constructed, and have a transverse dimension, based on the required interrelationship of the handle end portion 114 relative to the tab 115.

Figure 7:
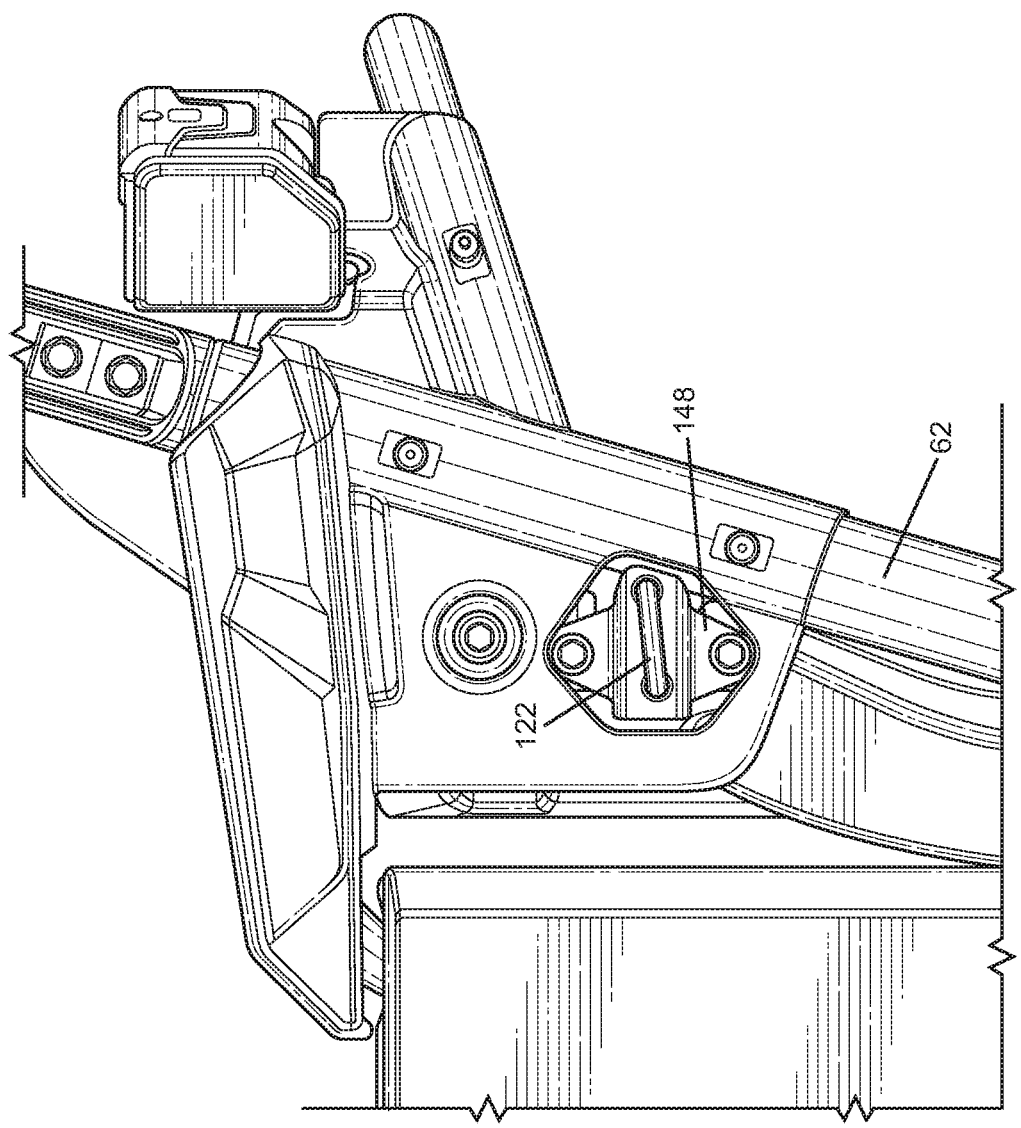
FIG. 7 is a side view showing a striker mounted on a cage side member, in accordance with the disclosed subject matter.

As described above and shown in FIG. 4, the assembly bracket 91 includes a latch mounting portion 94. A latch assembly 92 can be attached to the latch mounting portion 94. The latch assembly 92 can include a latch housing 120. The latch housing 120 can include a latch engagement arm 121. The latch engagement arm 121 can be constituted by structure that slides, rotates, or otherwise moves so as to releasably engage with a striker 122 mounted on the frame 18 of the vehicle 10. As a result of such engagement, the particular door, upon which the door module 90 is mounted, can be releasably held in a closed position. For example, the latch engagement arm 121 can include or be in the form of one or more movable claw(s) or hook(s) that engage(s) the striker 122 when the door panel assembly 42 is in the closed position. FIG. 5 shows the latch engagement arm 121 engaged with the striker 122. FIG. 7 shows the striker 122 when the latch engagement arm 121 does not engage the striker 122.

As shown in FIG. 4, the latch engagement arm can be manipulated by rotation of an actuator rod 123. The actuator rod 123 can include a handle shaft portion 124 having a length in the longitudinal direction L of the vehicle 10 and a latch shaft portion 125 having a length in longitudinal direction L of the vehicle 10. The latch shaft portion 125 can be connected to the handle shaft portion 124 by a bend portion 126. The bend portion 126 provides an offset of the latch shaft portion 125 relative to the handle shaft portion 124 (of the actuator rod 123). Accordingly, as the actuator rod 123 is rotated by manipulation of the handle assembly 93, as described below, the latch shaft portion 125 is moved in a transverse and/or vertical direction of the vehicle. This results in movement of the latch engagement arm 121 so as to provide securement of the door in a closed position or so as to disengage the door for opening of the door. In other words, the handle shaft portion 124 can be connected to the latch shaft portion 125 by a bend portion 126, such that rotation of the handle shaft portion 124 concentric about an axis, in the longitudinal direction L of the vehicle 10, results in transverse and rotational movement of the latch shaft portion 125 about the axis.

The assembly bracket 91 can further include a pair of bearing brackets 130, 131 and a pair of curved guide portions 132.

The bearing brackets 130, 131 can extend away from the handle end portion 114 of the assembly bracket 91 along the transverse direction T of the vehicle 10 and toward the outside of the vehicle 10. Each of the bearing brackets 130, 131 can include an aperture that rotatably receives and supports the handle shaft portion 124 of the actuator rod 123 such that the actuator rod 123 can rotate relative to the assembly bracket 91. The bearing brackets 130, 131 can be formed from the same piece of stamped metal plate as the remainder of the of the assembly bracket 91. However, alternate embodiments can include bearing brackets that are produced separately from the assembly bracket 91 and connected to the assembly bracket 91 in any appropriate manner such as but not limited to mechanical fasteners, welding, adhesives, etc.

The curved guide portions 132 can extend away from the handle end portion 114 of the assembly bracket 91 along the transverse direction T of the vehicle 10 and toward the outside of the vehicle 10. Each of the curved guide portions 132 can include a concave side that faces toward the top edge of the inner door panel 99 along the vertical direction V of the vehicle 10. The curved guide portions 132 can be formed from the same piece of stamped metal plate as the remainder of the of the assembly bracket 91. However, alternate embodiments can include curved guide portions that are produced separately from the assembly bracket 91 and connected to the assembly bracket 91 in any appropriate manner such as but not limited to mechanical fasteners, welding, adhesives, etc.

As described above, the assembly bracket 91 includes a handle mounting portion 95. A handle assembly 93 is positioned along the handle mounting portion 95.

The handle assembly 93 can include a handle 127 a recess 128 and a pair of curved extensions 129.

The handle 127 can include the recess 128. The recess 128 can be configured to receive fingers of a user for manipulation of the handle 127. FIG. 4 shows the rear side of the handle 127 such that the recess 128 is shown as a convex shape. That is, the handle 127 is mounted to the inner door panel 99 so that the handle 127 is exposed along a surface of the inner door panel 99 that faces inwardly toward the passenger compartment. The handle 127 can be fixedly attached to a portion or segment of the handle shaft portion 124 such that a pivoting motion of the handle 127 relative to the inner door panel 99 can rotate the handle shaft portion 124 relative to the bearing brackets 130, 131.

The connecting flange curved extensions 129 can be integral to the handle 127 and can extend away from the rear face of the handle 127 or attached to the handle 127 using an attachment mechanism or device. Attachment mechanisms or devices that can be used include mechanical fasteners, brackets, mating protuberances/recesses, spot welding, and/or welding, for example. Each of the curved extensions 129 can pivot along a respective one of the curved guide portions 132 when the handle 127 pivots relative to the door inner panel 99.

As shown in FIG. 4 and described above, the assembly bracket 91 includes an actuator rod flange 110, in accordance with at least one embodiment of the disclosed subject matter. The actuator rod flange 110 can include a bent portion, extending from the first vertical strip 103, that is connected and supports a plate or tab of the actuator rod flange 110. The plate or tab can include an aperture through which the actuator rod 123 passes. The aperture can be aligned with the apertures in the bearing brackets 130, 131. Accordingly, the actuator rod flange 110 can rotatably support the actuator rod 123.

As described above, the door module 90 can be used in a door or door assembly for ingress/egress of an occupant/user. The door module 90 as shown in FIG. 4 may be used in the rear door assembly 73, as shown in FIG. 2. Referring to FIG. 2, the front door assembly 70 can also be provided with a door module 140. The door module 140 can be the same as or similar to the door module 90 provided in the rear door assembly 73.

FIG. 5 is a left side view showing details of the door module 90 of FIG. 4, mounted on a inner door panel 99, in accordance with the disclosed subject matter. The inner door panel 99 is covered by an outer door panel as shown in FIGS. 1 and 2. The door module 90 is located between the inner door panel 99 and the outer door panel. The outer door panel is removed from the inner door panel 99 in FIG. 5. The assembly bracket 91 can be attached to the inner door panel 99 as described above. As shown in FIG. 5, the assembly bracket 91 can be attached to the inner door panel 99 using a first panel fastener 141, a second panel fastener 142, and a third panel fastener 143. The first strap segment 85 can include or be associated with an anchor 145. The anchor 145 can include a slot 146 for attaching to a portion 147 of the first strap segment 85. The portion 147 of the first strap segment 85 can include a doubled over end of the first strap segment 85 that is secured by a stitching arrangement, for example. The anchor 145 can be attached to the net attachment aperture 97 (of the assembly bracket 91) by a net assembly fastener 144. The net assembly fastener 144 may be a screw, bolt/nut, or other suitable fastener. The net assembly fastener 144 can pass through the anchor 145, through the inner door panel 99, and into the assembly bracket 91. The panel fasteners 141, 142, 143 may be a screw, bolt/nut, or some other suitable fastener.

In the alternate embodiment discussed above with respect to a net attachment structure that includes a threaded stud, the net assembly fastener 144 can be replaced by an aperture in the anchor 145 and a threaded nut that engages the threaded stud. In the alternate embodiment discussed above with respect to a net attachment structure that includes an unthreaded stud, the unthread stud can include a head spaced away from the net attachment portion 96 that is slightly larger in diameter than the diameter of the shaft of the unthreaded stud. In this alternate embodiment, the anchor 145 can include an elongated slot with an enlarged portion at one end of the elongated slot. The enlarged portion can be circular and can have a diameter that is slightly larger that the head of the unthreaded stud. The elongated slot can have a width perpendicular to its elongation that is less than the diameter of the head of the unthreaded stud. Thus, the head of the unthreaded stud can pass through the enlarged portion and slide to the other end of the elongated slot such that the anchor is sandwiched between the inner door panel 99 and the head of the unthreaded stud.

FIG. 6 is shows the surface of the inner door panel 99 of the left rear door assembly 73L that faces the passenger compartment. FIG. 6 shows further details of the door module of FIG. 4, mounted on the inner door panel 99, in accordance with the disclosed subject matter. Accordingly, FIG. 6 shows the door module 90 from the opposite side as is shown in FIG. 5. The assembly bracket 91, as shown in FIG. 6, is attached to the inner door panel 99. As shown, net assembly fastener 144 secures the first strap segment 85 to the assembly bracket 91. As shown, the anchor 145 can include a recess or counter bore, on one or both sides of the anchor 145, to receive a head or other portion of the net assembly faster 144.

It is appreciated that the disclosure is not limited to the anchor 145. Rather, it should be appreciated that other structure may be provided to secure the first strap segment 85 to the net attachment aperture 97. For example, the first strap segment 85 may be provided with a grommet or similar structure. The net assembly faster 144 can pass through the assembly bracket 91, i.e. through the net attachment aperture 97, and through such grommet so as to secure the first strap segment 85 to the assembly bracket 91.

Referring to FIG. 7, the striker 122 can be attached to or be a component of the frame assembly 18 of the vehicle 10. For example, the striker 122 can be secured to the second cage side member 62 directly or indirectly in any appropriate manner such as but not limited to mechanical fasteners, welding, adhesives, and one or more intermediate brackets. The striker 122 can have any appropriate structure that can be selectively engaged and disengaged by the latch engagement arm 121. For example, the striker 122 can be formed from a metal rod that is bent into a substantially U-shape or n-shape, with the free ends of the striker 122 welded to a first bracket 148 that is bolted to a second bracket that is welded to the second cage side member 62.

It is appreciated that the various components of embodiments of the disclosure can be made from any of a variety of materials including, for example, metal, plastic, plastic resin, nylon, composite material, leather, and/or rubber, for example, or any other material as may be desired.

As discussed above, the assembly bracket 91 can be formed from a sheet or flat plate of metal by a stamping process. An exemplary stamping process can include a step in which a pair of dies cuts a portion of the metal sheet or plate (also referred to as a blank). The stamping process can cut the first an second openings 104, 113 from the blank, and can bend portions of the blank to produce the 98, 110, 115, 116, 130, 131 and 132 such that the flat blank is transformed into the three-dimensional structure of the assembly bracket 91 and the individual features of the assembly bracket 91 discussed above constitute a one-piece, integral, homogenous structure. Thus, the assembly bracket 91 can be referred to as a stamped metal bracket. However, a variety of production techniques can be used to make the apparatuses as described herein. For example, suitable casting and/or injection molding and other molding techniques, extrusion and other manufacturing techniques might be utilized.

While the subject matter has been described in detail with reference to exemplary embodiments thereof, it will be apparent to one skilled in the art that various changes can be made, and equivalents employed, without departing from the scope of the invention.

For example, embodiments are disclosed above in which the assembly bracket 91 includes a plate or plate like structure that is or can be constructed of a single or unitary piece. However, embodiments are intended to include or otherwise cover an assembly bracket 91 that includes or is constructed of multiple pieces. For example, the multiple pieces of such an assembly bracket 91 can be in the form of stamped metal that are welded or heat bonded together so as to form the structure as shown in FIG. 4.

For example, embodiments are disclosed above in which the assembly bracket 91 includes a specific shape, geometry, or construction. It is appreciated that shape and structure of door assemblies, handle assemblies, latch assemblies, and net assemblies may vary between different types of vehicles. Accordingly, exemplary embodiments are also intended to include or otherwise cover assembly brackets that include variations in shape, geometry, or construction as dependent on assemblies with which the assembly bracket 91 is intended to be utilized.

The exemplary vehicle 10 of FIGS. 1-3 includes four door openings, four door assemblies and four seat. Alternate embodiments can include less than or more than four door assemblies, seats and door openings. For example, the vehicle can include a single door, a single door opening and a single seat, or a single door, a single door opening and two seats.

What is claimed is:

1. A door module for a door assembly, the door assembly selectively opening and closing an opening in a vehicle frame, the door assembly including a net assembly and a door panel, the door module comprising:
    an assembly bracket including:
        a plurality of panel attachment structures configured to attach the assembly bracket to the door panel;
        a net attachment portion configured to secure at least a portion of the net assembly when the net assembly is attached to the door assembly;
        a handle mounting portion; and
        a latch mounting portion;
    a latch assembly configured to releasably engage the vehicle frame when the door closes the opening, and the latch assembly is connected to the latch mounting portion; and
    a handle supported on the handle mounting portion, the handle mounting portion pivotally supports the handle relative to the assembly bracket, the handle being coupled to the latch assembly such that the latch assembly releases engagement with the frame assembly when the handle pivots in a predetermined direction.

2. The door module of claim 1, wherein the net engagement portion includes at least one aperture in the assembly bracket.

3. The door module of claim 1, wherein the net attachment portion is disposed between the handle mounting portion and the latch mounting portion.

4. The door module of claim 1, wherein the net attachment portion is disposed adjacent an upper edge of the assembly bracket.

5. The door module of claim 1, wherein the assembly bracket further includes:
    a first strip connected to and spaced away from the latch mounting portion;
    a second strip spaced away from the first strip and connected to the handle mounting portion; and
    a third strip connected to and extending from each of the first strip and the second strip, and the net attachment portion is provided on the third strip.

6. The door module of claim 5, wherein the third strip includes an expanded portion, and the net attachment portion is provided on the expanded portion of the upper central strip.

7. The door module of claim 6, wherein the net attachment portion includes a net attachment aperture through the expanded portion.

8. The door module of claim 5, wherein
    the assembly bracket further includes a fourth strip spaced away from the third strip and connected to and extending from each of the first strip and the second strip, and the first, second, third and fourth strips surround an opening through the assembly bracket.

9. The door module of claim 8, wherein the opening includes an expanded opening portion, and the expanded opening portion abuts the net attachment portion.

10. The door module of claim 8, wherein
the assembly bracket further includes:
a fifth strip connected to and extending away from each of the first strip and the latch mounting portion; and
a sixth strip connected and extending away from each of the first strip and the latch mounting portion,
the opening is a second opening, and the first strip, fifth strip, sixth strip, and the latch portion surround a first opening through the assembly bracket,
the second opening is located between the first opening and the handle mounting portion, and
the first opening is between the latch mounting portion and the second opening.

11. The door module of claim 1, further comprising an actuator rod that mechanically couples the handle assembly to the latch assembly, the actuator rod includes:
a handle shaft portion connected to the handle assembly and rotatably supported by the assembly bracket at a located that is spaced below the net attachment portion, and the latch mounting portion is spaced away from each of the net attachment portion and the handle mounting portion such that the handle shaft portion extends from the handle mounting and extends beyond the net attaching portion in a direction toward the latch mounting portion; and
a latch shaft portion having a length, the handle shaft portion is connected to the latch shaft portion by a bend portion such that rotation of the handle shaft portion concentric about an axis pivots the latch shaft portion about the axis.

12. The door module of claim 1, wherein the assembly bracket is a stamped metal bracket.

13. A door assembly for a vehicle, the door assembly for selectively opening and closing an opening in a vehicle frame of the vehicle, the door assembly including:
a door panel;
a net assembly that includes a mesh netting, a net frame connected to and surrounding the mesh netting, and a strap segment connected to and extending away from the net frame; and
a door module mounted on the door panel and including:
an assembly bracket including:
a plurality of panel attachment structure that supports fasteners and the fastener attaching the assembly bracket to the door panel;
a net attachment structure connected to the at least one strap segment;
a handle mounting portion; and
a latch mounting portion;
a latch assembly configured to releasably engage the vehicle frame when the door closes the opening, and the latch assembly is connected to the latch mounting portion; and
a handle supported on the handle mounting portion, the handle mounting portion pivotally supports the handle relative to the assembly bracket, the handle being coupled to the latch assembly such that the latch assembly releases engagement with the frame assembly when the handle pivots in a predetermined direction.

14. The door assembly of claim 13, wherein
the net attachment portion is disposed between the handle mounting portion and the latch mounting portion,
the assembly bracket includes an upper central strip, and the net attachment portion is provided on the upper central strip, and
the upper central strip includes an expanded portion, and the net attachment portion is provided on the expanded portion of the upper central strip.

15. The door assembly of claim 13, wherein
the net attachment portion includes a net attachment aperture located between the handle mounting portion and the latch mounting portion,
the net assembly further includes a net assembly fastener and an anchor, the anchor is connected the at least one strap, and the net assembly fastener passes through each of the anchor and the net attachment aperture.

16. The door assembly of claim 13, wherein
the assembly bracket further includes an opening located between the handle mounting portion and the latch mounting portion, and the opening includes an expanded opening portion, and
the net attachment portion includes an expanded portion that abuts the expanded opening portion.

17. The door assembly of claim 16, wherein the opening includes a main portion that is elongated along a first direction, the expanded opening portion is expanded in a second direction that is different from the first direction, and the expanded portion of the net attachment portion is spaced away from the main portion of the opening.

18. An all-terrain vehicle comprising:
a frame assembly including a plurality of frame members connected together to extend around a passenger area and form a door opening;
a plurality of wheels connected to the frame assembly, at least one of the wheels is configured to be driven by a powertrain; and
a door assembly pivotally connected to one of the frame members and movable between an open position where the door assembly spaced away from at least a portion of the door opening and closed position where the door assembly extends across the door opening, the door assembly includes:
a door panel assembly that extends across a first portion of the door opening when the door assembly is in the closed position; and
a net assembly that extends across a second portion of the door opening when the door assembly is in the closed position, the net assembly includes a first strap segment extending from and connected to the door assembly and a second strap segment extending from and connected one of the frame members; and
a door module connected to the panel assembly and including:
an assembly bracket including:
a plurality of panel attachment structures spaced along the assembly bracket;
a net attachment structure the first strap segment;
a handle mounting portion;
a latch mounting portion; and
a plurality of fasteners, each of the fasteners is connected to a respective one of the fastener structures and the door panel assembly;
a latch assembly configured to releasably engage the frame assembly when the door closes the opening, and the latch assembly is connected to the latch mounting portion; and a handle supported on the handle mounting portion, the handle mounting portion pivotally supports the handle relative to the assembly bracket, the handle being coupled to the latch assembly such that the latch assembly releases engagement with the frame assembly when the handle pivots in a pre-determined direction.

19. The all-terrain vehicle of claim 18, wherein
the door panel assembly includes a front portion and a rear portion, the latch assembly is located closer to the front portion than the rear portion, and
the net frame includes a plurality of corners, the first strap extends from a lower portion of the net frame at location that is located between a pair of the corners such that the first strap is spaced away from each of the pair of the corners, and the first strap portion is connected to the net attachment structure at a location that is between the front portion of the door panel assembly and the rear portion of the door panel assembly.

20. The all-terrain vehicle of claim 18, the at least one strap segment of the net assembly including a second strap segment and a third strap segment, and both the second strap segment and the third strap segment connected to the frame of the vehicle to support the net assembly.

* * * * *